(12) United States Patent
Patel et al.

(10) Patent No.: US 9,337,700 B2
(45) Date of Patent: May 10, 2016

(54) TERMINAL ASSEMBLY WITH REDUCED CREEPAGE

(75) Inventors: Dhaval Patel, Loves Park, IL (US);
Edward C. Allen, Davis, IL (US);
Laurence D. Vanek, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1098 days.

(21) Appl. No.: 13/043,835

(22) Filed: Mar. 9, 2011

(65) Prior Publication Data

US 2012/0228970 A1    Sep. 13, 2012

(51) Int. Cl.
*H02K 5/22*    (2006.01)
*H01R 13/52*   (2006.01)

(52) U.S. Cl.
CPC .............. *H02K 5/225* (2013.01); *H01R 13/521* (2013.01); *Y10T 29/49174* (2015.01)

(58) Field of Classification Search
CPC ...................................... H02K 5/225
USPC ........................................... 310/71
See application file for complete search history.

(56) References Cited

U.S. PATENT DOCUMENTS

| | | | |
|---|---|---|---|
| 3,045,171 A | 7/1962 | Heins et al. | |
| 3,808,489 A | 4/1974 | Albright et al. | |
| 3,899,731 A | 8/1975 | Smith | |
| 4,029,978 A | 6/1977 | Jager et al. | |
| 4,140,934 A | 2/1979 | Jager et al. | |
| 4,199,700 A | 4/1980 | Daugherty et al. | |
| 4,254,352 A | 3/1981 | Fidei et al. | |
| 4,712,029 A | 12/1987 | Nold | |
| 5,122,696 A | 6/1992 | Shih et al. | |
| 5,227,587 A * | 7/1993 | Paterek ................. | 174/152 GM |
| 5,358,432 A | 10/1994 | Shih et al. | |
| 5,523,635 A | 6/1996 | Ferreira et al. | |
| 5,949,167 A | 9/1999 | Blalock et al. | |
| 6,084,324 A | 7/2000 | Jeske | |
| 6,392,323 B1 | 5/2002 | Parker | |
| 6,424,063 B1 | 7/2002 | Whitener et al. | |
| 6,501,201 B1 | 12/2002 | Whitener et al. | |
| 6,528,917 B2 | 3/2003 | Shimamoto et al. | |
| 6,538,339 B2 | 3/2003 | Krizek et al. | |
| 6,628,024 B1 | 9/2003 | Mirmobin | |
| 6,681,477 B2 | 1/2004 | Shimamoto et al. | |
| 6,897,584 B2 | 5/2005 | Doherty et al. | |
| 7,521,829 B2 | 4/2009 | Semba et al. | |
| 7,527,523 B2 * | 5/2009 | Yohn ....................... | H01R 4/30 439/564 |
| 7,728,473 B2 | 6/2010 | Semba et al. | |
| 2003/0000726 A1 * | 1/2003 | Miyakoshi ................. | 174/65 R |
| 2003/0203673 A1 * | 10/2003 | Doherty et al. ............... | 439/559 |
| 2004/0027078 A1 * | 2/2004 | Xu et al. ....................... | 318/107 |
| 2008/0073987 A1 * | 3/2008 | Kataoka et al. ................. | 310/71 |
| 2012/0133224 A1 * | 5/2012 | Grosskopf et al. .............. | 310/71 |

FOREIGN PATENT DOCUMENTS

JP    2003317821 A    11/2003

OTHER PUBLICATIONS

Chinese Search Report for Chinese Patent Application No. 201210060977.3 completed on Mar. 19, 2014.

* cited by examiner

*Primary Examiner* — Terrance Kenerly
(74) *Attorney, Agent, or Firm* — Carlson, Gaskey & Olds, P.C.

(57) ABSTRACT

A terminal assembly includes a terminal board with an interrupted aperture to receive a passthrough.

21 Claims, 5 Drawing Sheets

US 9,337,700 B2

TERMINAL ASSEMBLY WITH REDUCED CREEPAGE

BACKGROUND

The present disclosure relates to rotating electrical machines such as high speed starter generators for gas turbine engines and, more particularly, to a terminal board assembly used to transmit electrical energy therefor.

An aircraft may include various types of rotating electrical machines such as, for example, generators, motors, and starter/generators. Starter/generators may be operated as either a starter or a generator.

The electrical power output from, or supplied to, the starter-generator may be communicated via one or more terminal assemblies. Each terminal assembly may include feedthroughs that are coupled to stator output leads within the generator housing and to a terminal block assembly outside of the generator housing.

Terminal assemblies are designed to provide various clearances, such as "strike" performance, breakthrough performance and creepage performance. Creepage is typically the shortest path between two conductive components or between a conductive component and a bounding surface measured along the surface of the insulating material. A proper and adequate creepage distance protects against tracking, a process that produces a partially conducting path of localized deterioration on the surface of the insulating material as a result of electric discharges on or close to an insulation surface. In some instances, collection of foreign object debris near the terminal assembly may potentially affect performance with regards to clearance and creepage.

SUMMARY

A terminal assembly according to an exemplary aspect of the present disclosure includes a terminal board with an interrupted aperture and an interface defined at least partially around the interrupted aperture. A passthrough with a first radially extending flange and a second radially extending flange, the passthrough extends through the interrupted aperture and the first radially extending flange engaged with the interface.

A terminal assembly according to an exemplary aspect of the present disclosure includes a terminal board with an interrupted aperture. A passthrough with a first radially extending flange and a second radially extending flange, the first radially extending flange of a diameter greater than the second radially extending flange, the passthrough extends through the interrupted aperture.

A starter-generator for a gas turbine engine according to an exemplary aspect of the present disclosure includes a housing having a bore. A terminal board mounted to the housing with an interrupted aperture aligned with the bore and an interface defined at least partially around the interrupted aperture. A passthrough with a first radially extending flange and a second radially extending flange, the passthrough extends through the interrupted aperture. The first radially extending flange engaged with the interface, and the second radially extending flange located within the bore.

A method of installing a terminal assembly in a starter-generator according to an exemplary aspect of the present disclosure includes installing a passthrough with a first radially extending flange and a second radially extending flange at least partially through an interrupted aperture with an interface defined at least partially around the interrupted aperture, the first radially extending flange engaged with the interface.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
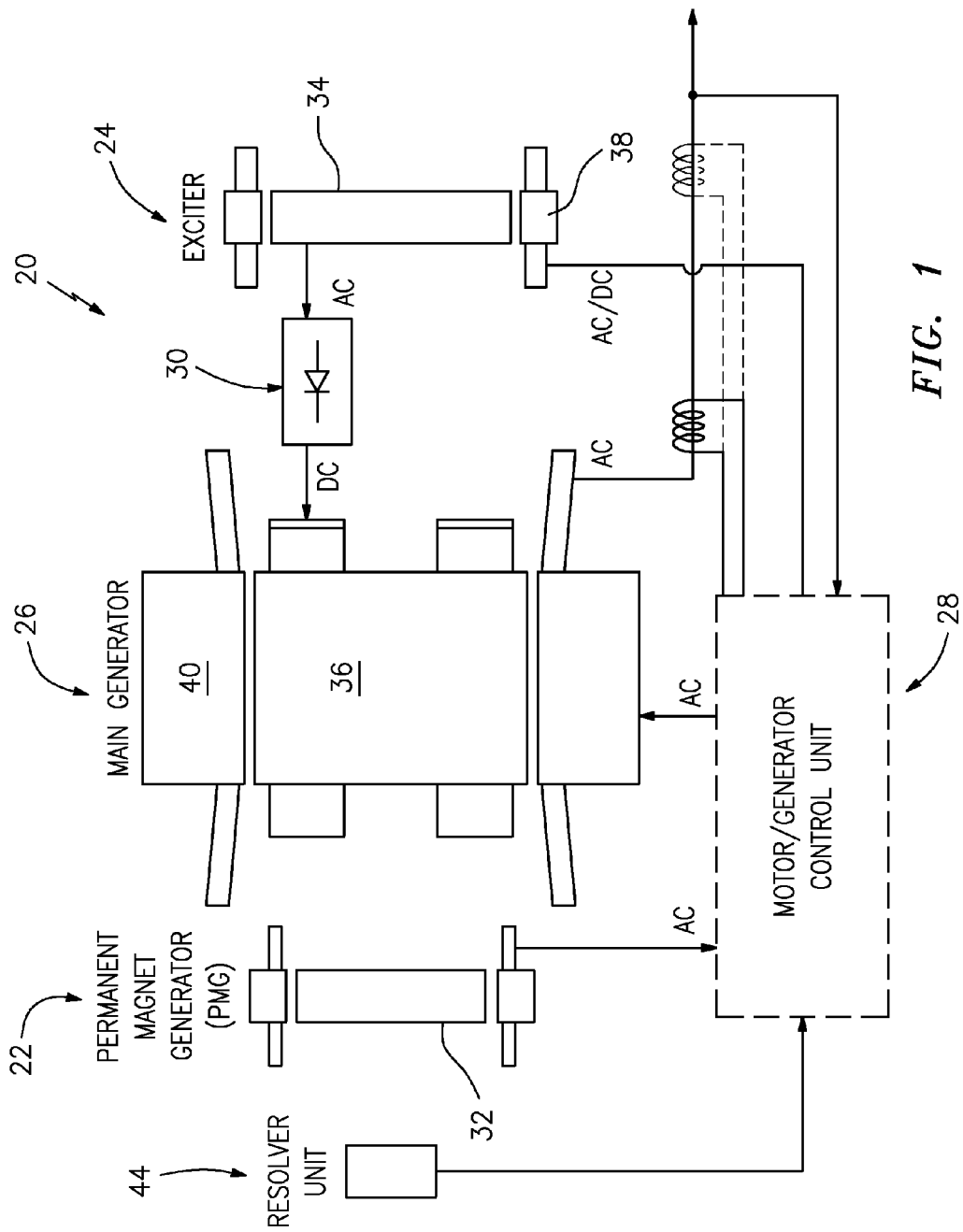
FIG. 1 is a functional schematic block diagram of a synchronous starter-generator system.

FIG. 1 schematically illustrates a functional block diagram of one embodiment of a starter-generator system 20. This exemplary starter/generator system 20, which is commonly known as a brushless AC starter/generator, includes a permanent magnet generator (PMG) 22, an exciter 24, a main/generator 26, a starter/generator control unit 28, and one or more rectifiers 30. The starter/generator system 20 may be used as a starter-generator for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)). It is to be appreciated, however, that the present invention is not limited to use in conjunction with a specific type of electrical machine. Thus, although the present invention is, for convenience of explanation, depicted and described as being implemented in a starter generator, it will be appreciated that it can be implemented in other electric machines.

When the starter/generator system 20 is operating as a generator, a rotor 32 of the PMG 22, a rotor 34 of the exciter 24, and a rotor 36 of the main starter/generator 26 all rotate. As the PMG rotor 32 rotates, the PMG 22 generates and supplies AC power to the starter/generator control unit 28, which in turn supplies direct current (DC) power to a stator 38 of the exciter 24. The exciter rotor 34 in turn supplies AC power to the rectifier 30. The output from the rectifier 30 is DC power and is supplied to the main starter/generator rotor 36, which in turn outputs AC power from a main starter/generator stator 40. The starter/generator system 20 may supply output power at a variety of frequencies, or alternatively, a gearing system may be used to operate the starter/generator at a constant speed and, thus, supply a constant frequency. The output power from the main starter/generator stator 40 is typically three-phase AC power.

Figure 2:
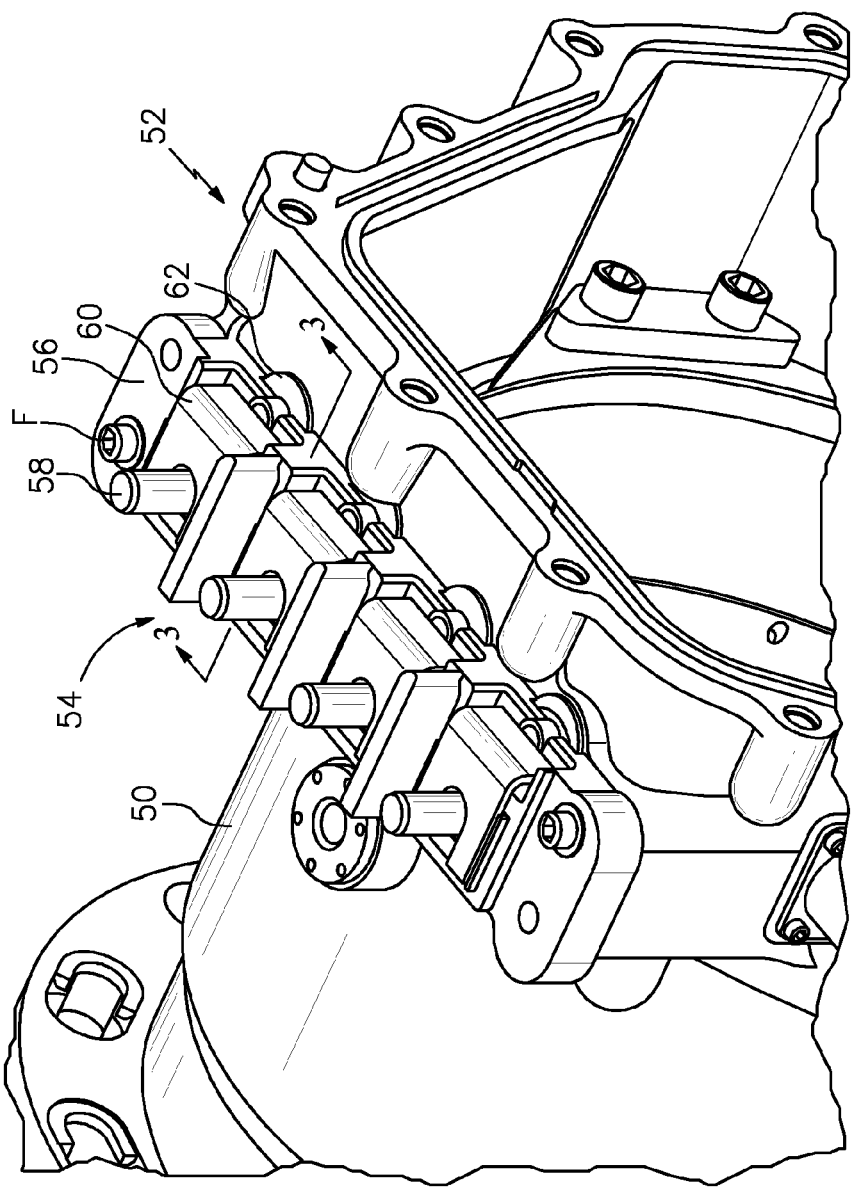
FIG. 2 is a perspective view of the starter generator housing and terminal board assembly.

When the starter/generator system 20 is in operation as a starter motor, AC power is supplied to the exciter stator 38 and the main starter/generator stator 40 from, for example, an AC power supply section in the starter/generator control unit 28 to cause the main starter/generator rotor 36 to rotate. As the main starter/generator rotor 36 rotates, the PMG rotor 32 and exciter rotor 34 also rotate. A position sensing device, such as a resolver 44, may also be included in the starter/generator system 20 to supply a signal representative of the main starter/generator rotor 36 position to the starter/generator control unit 28. This position signal is used to control the AC power supplied to the main starter/generator stator 40 and to the exciter 24 such that the maximum torque is generated With reference to FIG. 2, the starter/generator system 20 may be housed within a generator housing 50 having a terminal housing section 52. The terminal housing section 52 may be an integral part of the generator housing 50, or may be a separate part mounted thereto. In either case, the terminal housing section 52 provides the electrical interface to external equipment and systems. In particular, one or more terminal assemblies 54 are each mounted to the generator housing 50 in the terminal housing section 52 and provide the electrical interface.

Figure 3:
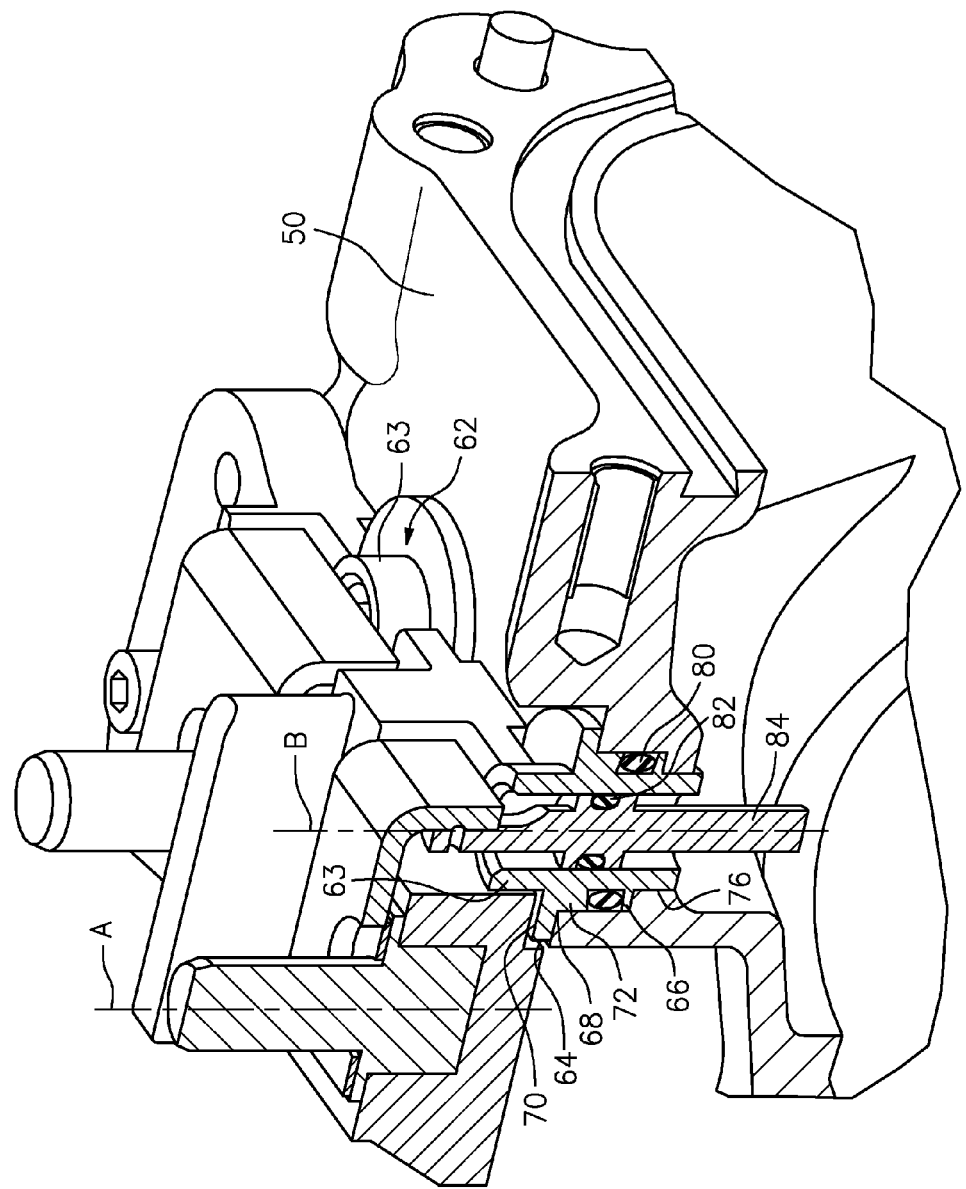
FIG. 3 is a sectional view of a terminal assembly along line 3-3 in FIG. 2.

The terminal assembly 54 generally includes a terminal board 56 which contains one or more terminal posts 58 and supports terminal connections 60 and passthroughs 62 (also illustrated in FIG. 3). The terminal board 56 is mounted to the housing 50 through fasteners F such as bolts or the like which are threaded into the housing 50. The terminal board 56 and passthroughs 62 may be manufactured of a non-metallic material such as Torlon® Polyamide plastic while the terminal posts 58 and terminal connections 60 are manufactured of electrically conductive materials such as a steel alloy or copper alloy respectively.

Figure 4:
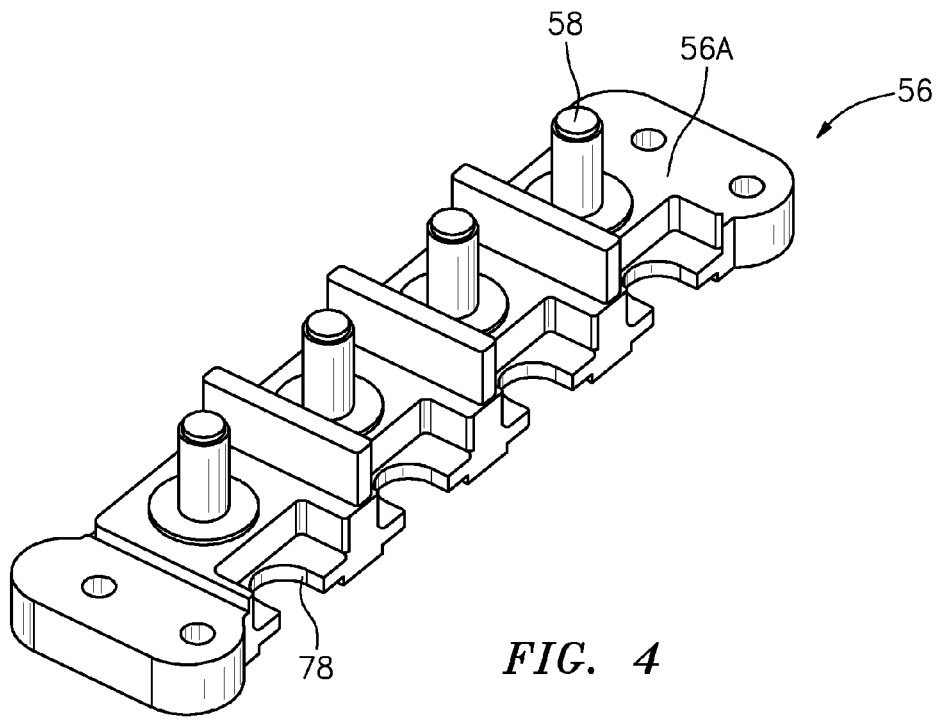
FIG. 4 is a top view of a terminal board of the terminal assembly.
Figure 5:
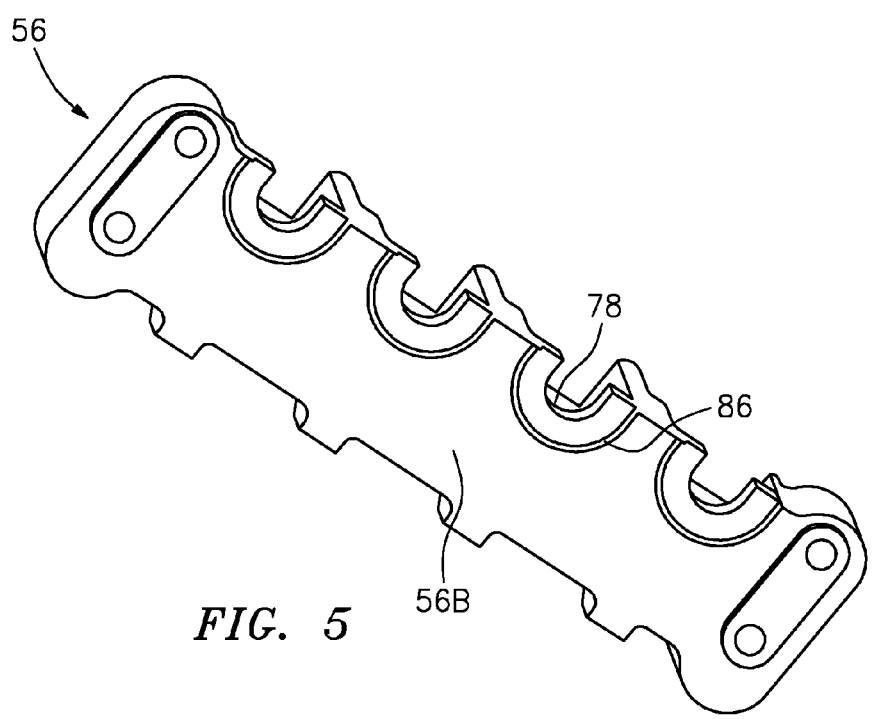
FIG. 5 is a bottom view of the terminal board of the terminal assembly.

The terminal posts 58 extend from one side 56A (FIG. 4) of the terminal board 56 and the passthroughs 62 are engaged with an opposite side 56B (FIG. 5) of the terminal board 56. In one disclosed non-limiting embodiment, the terminal posts 58 are offset from the passthroughs 62 (FIG. 3). That is, the terminal posts 58 are defined along a first axis A and the passthroughs 62 are defined along a second axis B. The terminal connections 60 extend through the passthroughs 62 and are in electrical contact with the terminal posts 58.

Figure 6:
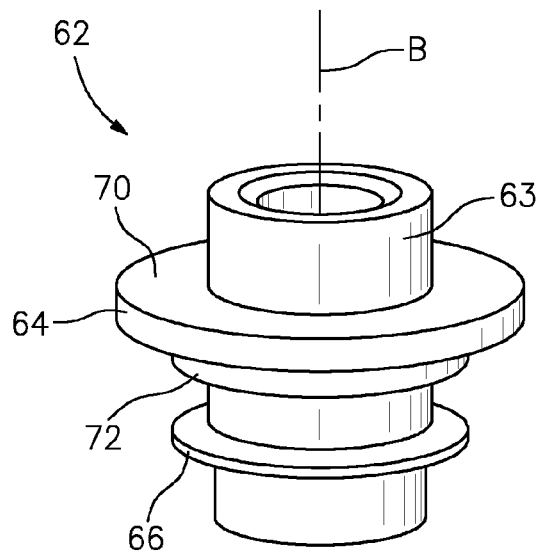
FIG. 6 is a perspective view of a feedthrough of the terminal assembly.
Figure 7:
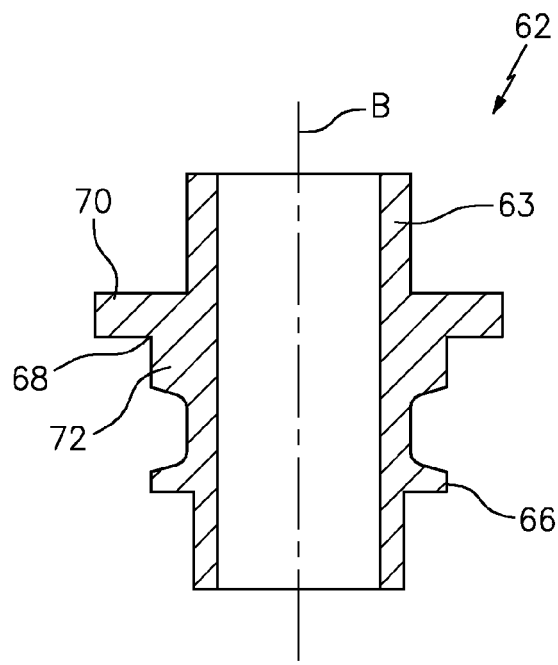
FIG. 7 is a sectional view of a feedthrough of the terminal assembly.

With reference to FIG. 3, each passthrough 62 includes a generally annular body 63 with a first radially extending flange 64 and a second radially extending flange 66 (FIG. 6). The first radially extending flange 64 includes a stepped surface 68 (FIG. 7) between a first radially extending flange section 70 that is of a diameter greater than the second radially extending flange 66 and a second radially extending flange section 72 which is of a diameter generally equivalent to the second radially extending flange 66.

The second radially extending flange section 72 and the second radially extending flange 66 are received within a bore 76 in the housing 50 such that the first radially extending flange section 70 covers a portion of the housing 50 and increase the creep path from the terminal connection 60 to the housing 50. That is, the first radially extending flange section 70 extends beyond the diameter of the bore 76. A first seal 80 such as an O-ring may be positioned around the passthrough 62 between the second radially extending flange section 72 and the second radially extending flange 66 provide a leak tight seal between the inside and outside of the generator housing 50 to contain oil therein. A second seal 82 such as an O-ring may also be positioned around a pin 84 of the terminal connection 60 and the passthrough 62 to facilitate the leak tight seal between the inside and outside of the generator housing 50. It should be understood that the pin 84 at terminal connection 60 may be a unitary component which is welded or otherwise fitted together.

The terminal board 56 includes a multiple of interrupted apertures 78 (FIGS. 4 and 5) which each receive the generally annular body 63 of the passthrough 62. The opposite side 56B of the terminal board 56 also includes an interface 86 which at least partially receives the first radially extending flange section 70. The interface 86 in one disclosed non-limiting embodiment may include semi-circular recessed areas defined about the interrupted aperture 78 which receive each of the first radially extending flange sections 70 to further orient and restrain each passthrough 62 with respect to the terminal board 56.

The passthroughs 62 disclosed herein increase clearance between conducting materials and also improve the physical shielding of the terminals to not only improve clearance performance but also improve creepage performance by lengthening or extending the path over the surface of the non-conducting material.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A terminal assembly comprising:
   a terminal board with an interrupted aperture and an interface defined at least partially around said interrupted aperture;
   a passthrough with a first radially extending flange and a second radially extending flange, said passthrough extends through said interrupted aperture and said first radially extending flange engaged with said interface; and
   a terminal post mounted to said terminal board along a first axis, said passthrough being defined along a second axis offset from said first axis.

2. The terminal assembly as recited in claim 1, wherein said interface is semi-circular.

3. The terminal assembly as recited in claim 1, wherein said first radially extending flange includes a stepped surface between a first radially extending flange section of a diameter greater than said second radially extending flange and a second radially extending flange section of a diameter generally equivalent to said second radially extending flange.

4. The terminal assembly as recited in claim 3, wherein said first radially extending flange section is engaged with said interface.

5. The terminal assembly as recited in claim 4, wherein said interface is semi-circular.

6. The terminal assembly as recited in claim 1, further comprising a terminal connection that extends through said passthrough and is in electrical contact with said terminal post.

7. The terminal assembly as recited in claim 1, wherein said interrupted aperture has an open lateral side and opposed open ends at respective opposed sides of the terminal board.

8. A terminal assembly comprising:
  a terminal board with an interrupted aperture, said terminal board including an interface defined at least partially around said interrupted aperture, said interface being semi-circular; and
  a passthrough with a first radially extending flange and a second radially extending flange, said first radially extending flange of a diameter greater than said second radially extending flange, said passthrough extends through said interrupted aperture.

9. The terminal assembly as recited in claim 8, wherein said first radially extending flange is engaged with said interface.

10. The terminal assembly as recited in claim 8, further comprising a terminal post mounted to said terminal board along a first axis and said passthrough is defined along a second axis offset from said first axis.

11. The terminal assembly as recited in claim 10, further comprising a terminal connection that extends through said passthrough and is in electrical contact with said terminal post.

12. The terminal assembly as recited in claim 8, wherein said interrupted aperture has an open lateral side and opposed open ends at respective opposed sides of the terminal board.

13. A starter-generator for a gas turbine engine comprising:
  a housing having a bore;
  a terminal board mounted to said housing with an interrupted aperture aligned with said bore and an interface defined at least partially around said interrupted aperture, said terminal board including an interface defined at least partially around said interrupted aperture, said interface being semi-circular; and
  a passthrough with a first radially extending flange and a second radially extending flange, said passthrough extends through said interrupted aperture, said first radially extending flange engaged with said interface, and said a second radially extending flange located within said bore.

14. The starter-generator for a gas turbine engine as recited in claim 13, wherein said first radially extending flange includes a stepped surface between a first radially extending flange section of a diameter greater than said second radially extending flange and a second radially extending flange section of a diameter generally equivalent to said second radially extending flange.

15. The starter-generator as recited in claim 13, further comprising a terminal post mounted to said terminal board along a first axis, and said passthrough being defined along a second axis offset from said first axis.

16. The starter-generator as recited in claim 13, wherein said interrupted aperture has an open lateral side and opposed open ends at respective opposed sides of the terminal board.

17. A method of installing a terminal assembly in a starter-generator comprising:
  installing a passthrough with a first radially extending flange and a second radially extending flange at least partially through an interrupted aperture of a terminal board with a semi-circular interface defined around the interrupted aperture, the first radially extending flange engaged with the interface.

18. The method as recited in claim 17, wherein the first radially extending flange includes a stepped surface between a first radially extending flange section of a diameter greater than the second radially extending flange and a second radially extending flange section of a diameter generally equivalent to the second radially extending flange.

19. The method as recited in claim 17, further comprising mounting a terminal post to the terminal board along a first axis.

20. The method as recited in claim 19, further comprising mounting the passthrough along a second axis offset and parallel to the first axis.

21. The method as recited in claim 17, wherein said interrupted aperture has an open lateral side and opposed open ends at respective opposed sides of the terminal board.

\* \* \* \* \*